(12) United States Patent
Jee et al.

(10) Patent No.: US 12,469,891 B2
(45) Date of Patent: Nov. 11, 2025

(54) BATTERY MANAGEMENT APPARATUS AND METHOD

(71) Applicant: LG Energy Solution, Ltd., Seoul (KR)

(72) Inventors: Su-Won Jee, Daejeon (KR); Dae-Soo Kim, Daejeon (KR); Young-Deok Kim, Daejeon (KR); Hyun-Jun Choi, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 713 days.

(21) Appl. No.: 17/788,518

(22) PCT Filed: Jul. 16, 2021

(86) PCT No.: PCT/KR2021/009212
§ 371 (c)(1),
(2) Date: Jun. 23, 2022

(87) PCT Pub. No.: WO2022/015116
PCT Pub. Date: Jan. 20, 2022

(65) Prior Publication Data
US 2023/0039356 A1    Feb. 9, 2023

(30) Foreign Application Priority Data

Jul. 16, 2020   (KR) .................. 10-2020-0088355
Jul. 23, 2020   (KR) .................. 10-2020-0091830

(51) Int. Cl.
*H01M 10/44*      (2006.01)
*G01R 31/36*      (2020.01)
(Continued)

(52) U.S. Cl.
CPC ........ *H01M 10/44* (2013.01); *G01R 31/3648* (2013.01); *G01R 31/367* (2019.01);
(Continued)

(58) Field of Classification Search
CPC ............ H02J 7/007182; H02J 7/00032; G01R 31/3835; G01R 31/367; G01R 31/3648; H01M 10/44; H01M 10/48
(Continued)

(56) References Cited

U.S. PATENT DOCUMENTS

2012/0105069 A1   5/2012   Wang et al.
2012/0226455 A1   9/2012   Kumashiro et al.
(Continued)

FOREIGN PATENT DOCUMENTS

CN    102565710 A    7/2012
CN    110045293 A    7/2019
(Continued)

OTHER PUBLICATIONS

Extended European Search Report for Application No. 21842626.0 dated Jun. 16, 2023. 9 pgs.
(Continued)

*Primary Examiner* — Nathaniel R Pelton
(74) *Attorney, Agent, or Firm* — Lerner David LLP

(57) ABSTRACT

A battery management apparatus includes: a profile generating unit configured to obtain a battery profile representing a correspondence between voltage and capacity of a battery and generate a differential profile representing a correspondence between a differential voltage for the capacity of the battery and the capacity or a correspondence between a differential capacity for the voltage of the battery and the voltage based on the obtained battery profile; and a control unit configured to receive the generated differential profile from the profile generating unit, determine a target peak included in the received differential profile according to a rule corresponding to a type of the received differential profile, and determine a state of the battery based on a behavior change of the target peak with respect to a refer-
(Continued)

ence peak preset to correspond to the type of the received differential profile.

16 Claims, 7 Drawing Sheets

(51) Int. Cl.
  *G01R 31/367* (2019.01)
  *G01R 31/3835* (2019.01)
  *H01M 10/42* (2006.01)
(52) U.S. Cl.
  CPC ...... *G01R 31/3835* (2019.01); *H01M 10/425* (2013.01); *H01M 2010/4271* (2013.01)
(58) Field of Classification Search
  USPC .......................................................... 320/134
  See application file for complete search history.

(56) References Cited

U.S. PATENT DOCUMENTS

| | | | |
|---|---|---|---|
| 2013/0119940 A1 | 5/2013 | Iriyama et al. | |
| 2015/0293182 A1 | 10/2015 | Tajima et al. | |
| 2016/0061908 A1 | 3/2016 | Torai et al. | |
| 2016/0195589 A1 | 7/2016 | Hanyu et al. | |
| 2017/0038436 A1 | 2/2017 | Montaru | |
| 2017/0139014 A1* | 5/2017 | Yamamoto | H02J 7/00 |
| 2019/0202299 A1 | 7/2019 | Oh et al. | |
| 2020/0271727 A1 | 8/2020 | Bae et al. | |
| 2020/0295410 A1 | 9/2020 | Hong et al. | |
| 2020/0366115 A1 | 11/2020 | Kim et al. | |
| 2021/0046844 A1 | 2/2021 | Bae et al. | |
| 2021/0190878 A1 | 6/2021 | Lee et al. | |

FOREIGN PATENT DOCUMENTS

| | | |
|---|---|---|
| CN | 110888079 A | 3/2020 |
| CN | 110927607 A | 3/2020 |
| JP | 2013019709 A | 1/2013 |
| JP | 5315369 B2 | 10/2013 |
| JP | 2014139897 A | 7/2014 |
| JP | 5682955 B2 | 3/2015 |
| JP | 2015060761 A | 3/2015 |
| JP | 5940145 B2 | 6/2016 |
| JP | 6347212 B2 | 6/2018 |
| JP | 2018206612 A | 12/2018 |
| JP | 2019158597 A | 9/2019 |
| JP | 6638227 B2 | 1/2020 |
| KR | 20160144437 A | 12/2016 |
| KR | 101878538 B1 | 7/2018 |
| KR | 20190006452 A | 1/2019 |
| KR | 101930646 B1 | 3/2019 |
| KR | 20190081237 A | 7/2019 |
| KR | 20190118529 A | 10/2019 |
| KR | 20190118535 A | 10/2019 |
| KR | 20200026128 A | 3/2020 |
| KR | 20200030467 A | 3/2020 |

OTHER PUBLICATIONS

International Search Report for Application No. PCT/KR2021/009212 mailed Oct. 25, 2021, pp. 1-3.

* cited by examiner

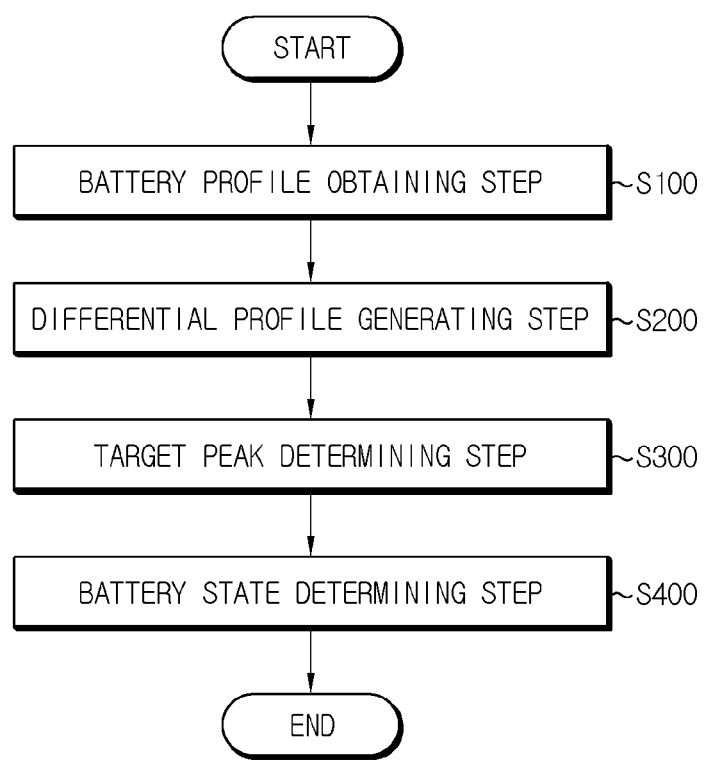

BATTERY MANAGEMENT APPARATUS AND METHOD

CROSS-REFERENCE TO RELATED APPLICATIONS

The present application is a national phase entry under 35 U.S.C. § 371 of International Application No. PCT/KR2021/009212 filed Jul. 16, 2021, which claims priority from Korean Patent Application No. 10-2020-0088355 filed Jul. 16, 2020, and Korean Patent Application No. 10-2020-0091830 filed Jul. 23, 2020, all of which are incorporated herein by reference.

TECHNICAL FIELD

The present disclosure relates to a battery management apparatus and method, and more particularly, to a battery management apparatus and method for determining a state of a battery from various aspects based on a differential profile for the battery.

BACKGROUND ART

Recently, the demand for portable electronic products such as notebook computers, video cameras and portable telephones has increased sharply, and electric vehicles, energy storage batteries, robots, satellites and the like have been developed in earnest. Accordingly, high-performance batteries allowing repeated charging and discharging are being actively studied.

Batteries commercially available at present include nickel-cadmium batteries, nickel hydrogen batteries, nickel-zinc batteries, lithium batteries and the like. Among them, the lithium batteries are in the limelight since they have almost no memory effect compared to nickel-based batteries and also have very low self-charging rate and high energy density.

However, the battery may be degraded as charging or discharging is repeated. For example, at the positive electrode of the battery, the battery may be degraded as the electrolyte is oxidized or the crystal structure is destroyed. At the negative electrode, the battery may be degraded since metallic lithium is precipitated. Conventionally, the degradation of the battery is diagnosed based on a battery profile obtained in the process of charging the battery.

Conventionally, the state of the battery is diagnosed based on the behavior of a peak included in a differential profile of the battery. However, conventionally, the state of the battery is diagnosed using a charging profile (a profile obtained in the charging process) or a discharging profile (a profile obtained in the discharging process), or it is limitedly diagnosed whether the positive electrode of the battery is degraded or the negative electrode is degraded for each peak.

Therefore, it is necessary to develop a technology for diagnosing a battery state from various aspects more accurately based on the behavior of a peak included in the differential profile of the battery.

SUMMARY

Technical Problem

The present disclosure is designed to solve the problems of the related art, and therefore the present disclosure is directed to providing a battery management apparatus and method, which determines a state of a battery from various aspects based on the behavior of a peak included in a differential profile for the battery.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

A battery management apparatus according to one aspect of the present disclosure may comprise: a control unit configured to receive a differential profile representing either (a) a correspondence between a differential voltage for a capacity of a battery and the capacity of the battery or (b) a correspondence between a differential capacity for the voltage of the battery and the voltage of the battery, based on a battery profile representing a correspondence between the voltage and the capacity of the battery, determine a target peak included in the received differential profile according to a rule corresponding to a type of the received differential profile, and determine a state of the battery based on a behavior change of the target peak with respect to a reference peak preset to correspond to the type of the received differential profile.

The control unit may be configured to in response to the differential profile being a differential voltage profile representing the correspondence between the differential voltage and the capacity, determine whether available lithium of the battery is lost based on the behavior change of the target peak with respect to the reference peak.

The control unit may be configured to in response to the differential profile being a differential capacity profile representing the correspondence between the differential capacity and the voltage determine at least one of (a) whether positive electrode capacity of the battery is lost or (b) whether the available lithium of the battery is lost, based on the behavior change of the target peak with respect to the reference peak.

The control unit may be configured to set a target capacity range based on a capacity of a reference voltage peak corresponding to the differential voltage profile, determine a target voltage peak included in the target capacity range of the differential voltage profile, and determine whether the available lithium is lost based on the reference voltage peak and the target voltage peak.

The reference voltage peak may be a peak whose corresponding capacity is smallest in a reference voltage profile corresponding to the differential voltage profile.

The control unit may be configured to determine a discharge end capacity based on the capacity of the reference voltage peak and set the target capacity range from a discharge end capacity of the battery to a second capacity symmetrical to the discharge end capacity of the battery.

The control unit may be configured to determine that there is only one target voltage peak and in response to there being only one target voltage peak, determine that available lithium of the battery is lost based on a differential voltage of the target voltage peak decreasing compared to a differential voltage of the reference voltage peak.

The control unit may be configured to determine that there are two or more target voltage peaks and determine that available lithium of the battery is lost based on there being two or more target voltage peaks.

The control unit may be configured to set a target voltage range of the differential capacity profile from a preset voltage to a charge end voltage preset for the battery, determine a target capacity peak included in the target voltage range of the differential capacity profile, and determine at least one of (a) whether the positive electrode capacity is lost or (b) whether the available lithium is lost, based on the target capacity peak and a reference capacity peak preset to correspond to the target capacity peak.

The control unit may be configured to set a reference capacity peak included in the target voltage range of a reference capacity profile preset to correspond to the differential capacity profile.

The control unit may be configured to determine whether the positive electrode capacity of the battery is lost according to a comparison of a differential capacity of the reference capacity peak to a differential capacity of the target capacity peak, and determine whether the available lithium of the battery is lost according to a comparison of the differential capacity and the voltage of the reference capacity peak to the differential capacity and the voltage of the target capacity peak, respectively.

The control unit may be configured to determine that available lithium of the battery is lost, in response to the differential capacity of the target capacity peak increasing compared to the differential capacity of the reference capacity peak and the voltage of the target capacity peak decreasing compared to the voltage of the reference capacity peak.

The control unit may be configured to determine that positive electrode capacity of the battery is lost, in response to the differential capacity of the target capacity peak decreasing compared to the differential capacity of the reference capacity peak.

The control unit may be configured to change at least one of a threshold value of a charging C-rate and a threshold value of a discharging C-rate preset for the battery, in response to the positive electrode capacity or the available lithium of the battery being lost.

A battery pack according to another aspect of the present disclosure may comprise the battery management apparatus according to any of the embodiments of the present disclosure described herein.

A battery management method according to another aspect of the present disclosure may comprise: obtaining a battery profile representing a correspondence between voltage of a battery and capacity of the battery; generating a differential profile representing either (a) a correspondence between a differential voltage for the capacity of the battery and the capacity of the battery or (b) a correspondence between a differential capacity for the voltage of the battery and the voltage based on the battery profile; determining a target peak included in the generated differential profile according to a rule corresponding to a type of the differential profile; and determining a state of the battery based on a behavior change of the target peak with respect to a reference peak preset to correspond to the type of the generated differential profile.

Advantageous Effects

According to one aspect of the present disclosure, since it may be determined whether positive electrode capacity is lost and/or available lithium is lost based on the behavior change of a target peak with respect to the reference peak, there is an advantage in that the state of the battery may be determined from more various aspects. That is, according to one aspect of the present disclosure, there is an advantage in that a new analysis method for a differential profile of a battery is proposed.

The effects of the present disclosure are not limited to the effects mentioned above, and other effects not mentioned will be clearly understood by those skilled in the art from the description of the claims.

BRIEF DESCRIPTION OF THE DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

FIG. 10 is a diagram schematically showing a battery management method according to another embodiment of the present disclosure.

DETAILED DESCRIPTION

It should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

Additionally, in describing the present disclosure, when it is deemed that a detailed description of relevant known elements or functions renders the key subject matter of the present disclosure ambiguous, the detailed description is omitted herein.

The terms including the ordinal number such as "first", "second" and the like, may be used to distinguish one element from another among various elements, but not intended to limit the elements by the terms.

Throughout the specification, when a portion is referred to as "comprising" or "including" any element, it means that the portion may include other elements further, without excluding other elements, unless specifically stated otherwise.

Furthermore, the term "control unit" described in the specification refers to a unit that processes at least one function or operation, and may be implemented by hardware, software, or a combination of hardware and software.

In addition, throughout the specification, when a portion is referred to as being "connected" to another portion, it is not limited to the case that they are "directly connected", but it also includes the case where they are "indirectly connected" with another element being interposed between them.

Hereinafter, preferred embodiments of the present disclosure will be described in detail with reference to the accompanying drawings.

Figure 1:
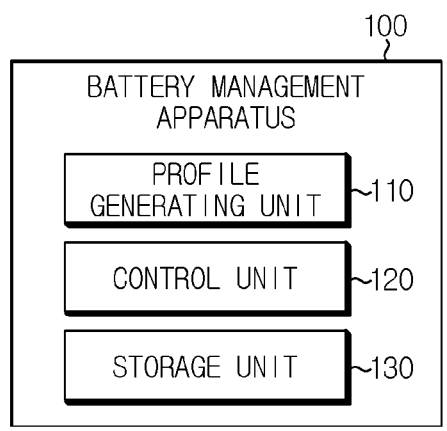
FIG. 1 is a diagram schematically showing a battery management apparatus according to an embodiment of the present disclosure.
Figure 2:
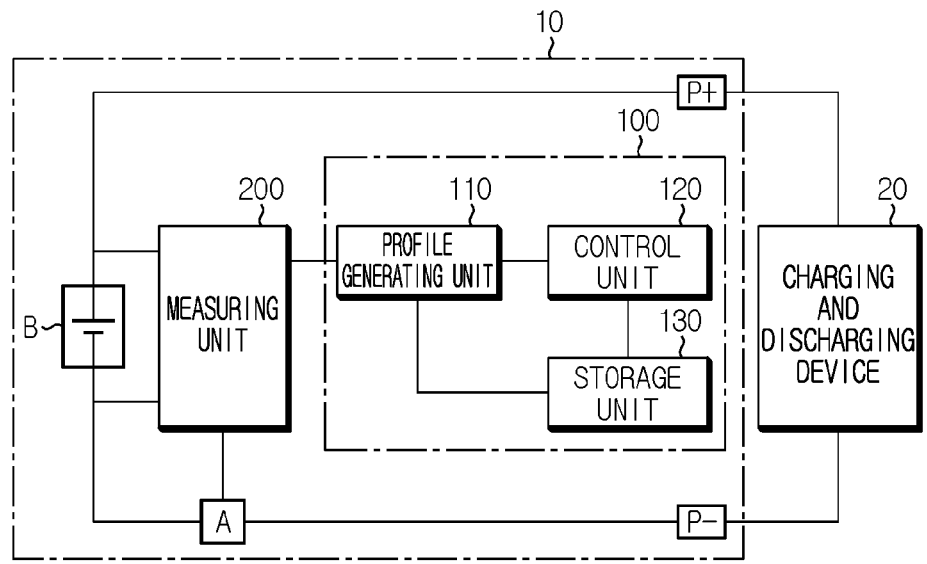
FIG. 2 is a diagram showing an exemplary configuration of a battery pack including the battery management apparatus according to an embodiment of the present disclosure.

FIG. 1 is a diagram schematically showing a battery management apparatus 100 according to an embodiment of the present disclosure. FIG. 2 is a diagram showing an exemplary configuration of a battery pack 10 including the battery management apparatus 100 according to an embodiment of the present disclosure.

Referring to FIG. 1, the battery management apparatus 100 according to an embodiment of the present disclosure may include a profile generating unit 110 and a control unit 120.

The profile generating unit 110 may be configured to obtain a battery profile representing a correspondence between voltage and capacity of a battery B.

Here, the battery B means one independent cell that includes a negative electrode terminal and a positive electrode terminal and is physically separable. For example, one lithium-ion cell or lithium polymer cell may be regarded as the battery B.

Specifically, the battery profile may be configured to represent a correspondence between voltage and capacity of the battery B that is measured while the battery B is being charged or discharged. That is, the profile generating unit 110 may obtain a battery profile for voltage and capacity measured while the battery B is being charged or discharged.

Figure 3:
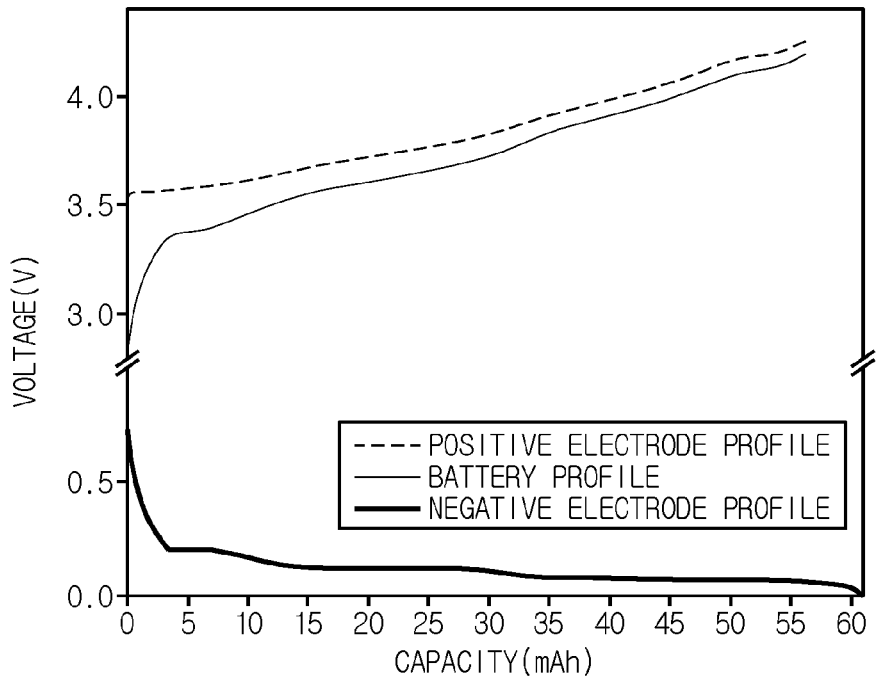
FIG. 3 is a diagram schematically showing a battery profile, a positive electrode profile, and a negative electrode profile according to an embodiment of the present disclosure.

FIG. 3 is a diagram schematically showing a battery profile, a positive electrode profile, and a negative electrode profile according to an embodiment of the present disclosure. Specifically, FIG. 3 is a diagram showing a battery profile, a positive electrode profile, and a negative electrode profile as a graph showing a correspondence between capacity and voltage.

Preferably, the battery profile may be configured to represent a correspondence between voltage and capacity of a battery B measured in the process of charging or discharging the battery B at a C-rate of 1 C or less. More preferably, the battery profile may be configured to represent a correspondence between the voltage and capacity of the battery B measured while the battery B is being charged or discharged at a C-rate of 0.05 C.

In the embodiment of FIG. 2, the battery B may be charged or discharged by a charging and discharging device 20. A measuring unit 200 may measure the voltage of the battery B through a plurality of sensing lines connected to the battery B. In addition, the measuring unit 200 may measure the capacity of the battery B using a current measuring unit A. Here, the unit of voltage may be [V], and the unit of capacity (Q) may be [mAh]. In addition, the measuring unit 200 may generate a battery profile representing the correspondence between the voltage and capacity of the battery B measured at the same time point, and transmit the generated battery profile to the profile generating unit 110. For example, the battery profile may be a table in which a voltage value and a capacity value measured at the same time point are mapped.

In addition, the profile generating unit 110 may be configured to generate a differential profile representing a correspondence between a differential voltage for the capacity of the battery B and the capacity or a correspondence between a differential capacity for the voltage of the battery B and the voltage based on the obtained battery profile.

Here, the differential voltage is obtained by differentiating voltage with respect to capacity, and may be expressed as "dV/dQ", and the unit may be [V/mAh]. In addition, the differential voltage profile may be expressed as an X-Y graph when X is set as capacity and Y is set as differential voltage.

In addition, the differential capacity is obtained by differentiating capacity with respect to voltage, and may be expressed as "dQ/dV", and the unit may be [mAh/V]. In addition, the differential capacity profile may be expressed as an X-Y graph when X is set as voltage and Y is set as differential capacity.

Specifically, the profile generating unit 110 may convert the obtained battery profile into a differential voltage profile. The profile generating unit 110 may extract voltage and capacity from the battery profile, and calculate a differential voltage (dV/dQ) for the capacity (Q). In addition, the profile generating unit 110 may generate a differential voltage profile representing a correspondence between the capacity (Q) of the battery B and the differential voltage (dV/dQ).

In addition, the profile generating unit 110 may convert the obtained battery profile into a differential capacity profile. The profile generating unit 110 may extract voltage and capacity from the battery profile, and calculate a differential capacity (dQ/dV) for the voltage (V). In addition, the profile generating unit 110 may generate a differential capacity profile representing a correspondence between the voltage of the battery B and the differential capacity (dQ/dV).

The control unit 120 may be configured to receive the generated differential profile from the profile generating unit 110.

Specifically, the control unit 120 and the profile generating unit 110 may be connected to each other to enable communication. For example, in the embodiment of FIG. 2, the control unit 120 and the profile generating unit 110 may be connected to each other, and the profile generating unit 110 may transmit the generated differential profile to the control unit 120.

The control unit 120 may be configured to determine a target peak included in the received differential profile according to a rule corresponding to the type of the received differential profile.

For example, when the differential profile received by the control unit 120 from the profile generating unit 110 is a differential voltage profile representing the correspondence between the differential voltage and the capacity, the control unit 120 may determine a peak included in a target capacity range of the differential voltage profile as the target peak.

As another example, when the differential profile received by the control unit 120 from the profile generating unit 110 is a differential capacity profile representing the correspondence between the differential capacity and the voltage, the control unit 120 may determine a peak included in the target voltage range of the differential capacity profile as the target peak. The target peak determined in the differential voltage profile and the differential capacity profile will be described below in detail with reference to FIGS. 4 to 9.

The control unit 120 may be configured to determine the state of the battery B based on a behavior change of the target peak with respect to a reference peak preset to correspond to the type of the received differential profile.

Preferably, the reference peak may be set to correspond to the type of the differential profile, respectively. That is, the reference peak configured to correspond to the differential voltage profile and the reference peak configured to correspond to the differential capacity profile may be different from each other.

For example, when the received differential profile is the differential voltage profile, the control unit 120 may be configured to determine whether available lithium of the battery B is lost based on the behavior change of the target peak with respect to the reference peak.

As another example, when the received differential profile is the differential capacity profile, the control unit 120 may be configured to determine at least one of whether positive electrode capacity of the battery B is lost and whether the available lithium is lost based on the behavior change of the target peak with respect to the reference peak.

That is, according to one aspect of the present disclosure, since it may be determined whether the positive electrode capacity is lost and/or whether the available lithium is lost based on the behavior change of the target peak with respect to the reference peak, there is an advantage in that the state of the battery B may be determined in more various aspects.

Meanwhile, the control unit 120 provided to the battery management apparatus 100 according to an embodiment of the present disclosure may selectively include processors known in the art, application-specific integrated circuit (ASIC), other chipsets, logic circuits, registers, communication modems, data processing devices, and the like to execute various control logic performed in the present disclosure. Also, when the control logic is implemented in software, the control unit 120 may be implemented as a set of program modules. At this time, the program module may be stored in a memory and executed by the control unit 120. The memory may be located inside or out of the control unit 120 and may be connected to the control unit 120 by various well-known means.

In addition, the battery management apparatus 100 according to an embodiment of the present disclosure may further include a storage unit 130. The storage unit 130 may store program, data, and the like required by the control unit 120. That is, the storage unit 130 may store data necessary for operation and function of each component of the battery management apparatus 100 according to an embodiment of the present disclosure, data generated in the process of performing the operation or function, or the like. The storage unit 130 is not particularly limited in its kind as long as it is a known information storage means that can record, erase, update and read data. As an example, the information storage means may include random access memory (RAM), flash memory, read-only memory (ROM), electrically erasable programmable read-only-memory (EEPROM), registers, and the like. In addition, the storage unit 130 may store program codes in which processes executable by the control unit 120 are defined.

For example, in the embodiment of FIG. 2, the storage unit 130 may be connected to the profile generating unit 110 and the control unit 120, respectively. In addition, the storage unit 130 may store the differential profile generated by the profile generating unit 110. The control unit 120 may receive the differential profile directly from the profile generating unit 110, or may access the storage unit 130 to obtain the differential profile.

Hereinafter, an embodiment in which the control unit 120 determines the state of the battery B based on the differential voltage profile will be described in detail. In addition, hereinafter, the target peak corresponding to the differential voltage profile will be described as a target voltage peak, and the reference peak will be described as a reference voltage peak.

Specifically, an embodiment in which the control unit 120 determines whether available lithium of the battery B is lost based on the target voltage peak and the reference voltage peak will be described in detail.

Figure 4:
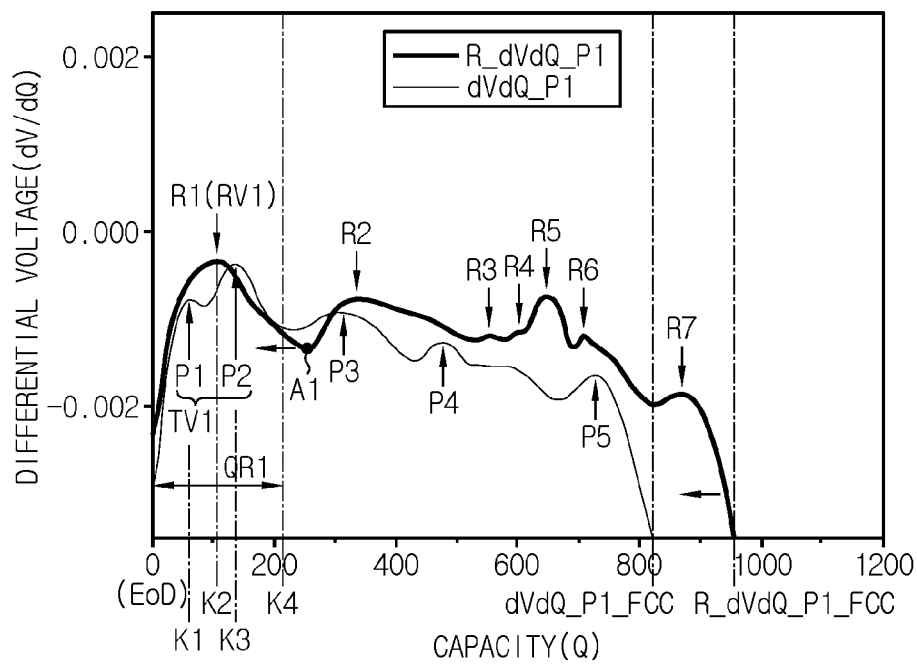
FIG. 4 is a diagram schematically showing a first reference voltage profile and a first differential voltage profile according to an embodiment of the present disclosure.

FIG. 4 is a diagram schematically showing a first reference voltage profile (R_dVdQ_P1) and a first differential voltage profile (dVdQ_P1) according to an embodiment of the present disclosure.

Specifically, FIG. 4 is a diagram illustrating a first reference voltage profile (R_dVdQ_P1) for a battery B in a beginning of life (BoL) state and a first differential voltage profile (dVdQ_P1) for a battery B in which available lithium is lost.

For example, referring to FIG. 4, the profile generating unit 110 may generate a first differential voltage profile (dVdQ_P1) representing the correspondence between the capacity (Q) of the battery B and the differential voltage (dV/dQ).

The control unit 120 may be configured to set a target capacity range based on the capacity of the reference voltage peak corresponding to the differential voltage profile in the entire capacity range of the differential voltage profile. That is, the control unit 120 may set the target capacity range among the entire capacity range of the differential voltage profile based on the capacity of the reference voltage peak.

Specifically, the target capacity range may be set based on the capacity of a preset reference voltage peak. For example, the target capacity range may be preset and input to the control unit 120 or may be directly set by the control unit 120.

For example, in the embodiment of FIG. 4, the target capacity range (QR1) may be set to a range of 0 [mAh] or more and K4 [mAh] or less. A specific embodiment in which the control unit 120 sets the target capacity range (QR1) will be described later.

The control unit 120 may be configured to determine a peak included in the target capacity range of the differential voltage profile as a target voltage peak.

First, the control unit 120 may be configured to determine a plurality of peaks from the received differential voltage profile.

Specifically, the control unit 120 may calculate an instantaneous change rate of the differential voltage with respect to the capacity from the received differential voltage profile. In addition, the control unit 120 may determine a point where the instantaneous change rate of the differential voltage for the capacity at a low capacity side is positive among points where the calculated instantaneous change rate is 0 and the instantaneous change rate of the differential voltage for the capacity at a high capacity side is negative as a peak. That is, the control unit 120 may determine an upward convex point in the differential voltage profile as a peak.

For example, in the embodiment of FIG. 4, the control unit 120 may determine a plurality of peaks P1, P2, P3, P4, P5 in the first differential voltage profile (dVdQ_P1). The plurality of peaks P1, P2, P3, P4, P5 are points at which the instantaneous change rate of the differential voltage for the capacity is 0. Based on the corresponding peaks, the instantaneous change rate of the differential voltage for the capacity at the low-capacity side may be positive, and the instantaneous change rate of the differential voltage for the capacity at the high-capacity side may be negative. In addition, the control unit 120 may determine the peak P1 and the peak P2 included in the target capacity range (QR1) among the plurality of peaks P1, P2, P3, P4, P5 in the first differential voltage profile (dVdQ_P1) as a target voltage peak (TV1).

In addition, the control unit 120 may be configured to determine a behavior change of the target voltage peak with respect to the reference voltage peak.

The reference voltage peak may be preset as a peak whose corresponding capacity is smallest in a reference voltage profile preset to correspond to the differential voltage profile. Here, the reference voltage peak may be preset and input to the control unit 120, or the control unit 120 may set a peak whose corresponding capacity is smallest among a plurality of peaks included in the reference voltage profile as the reference voltage peak. Preferably, the reference voltage peak may be set by the control unit 120.

In addition, the reference voltage profile may be a differential profile generated in the process of discharging a reference cell. Here, the reference cell is a cell corresponding to the battery B, and may be a battery B in a BoL state or a battery separately manufactured to generate the reference voltage profile. However, hereinafter, for convenience of explanation, the reference cell will be described as a battery B in a BoL state.

Preferably, the reference voltage profile may be a differential voltage profile obtained based on the voltage and capacity of the reference cell measured while the reference cell is discharged at a C-rate of 1 C or less. More preferably, the reference voltage profile may be a differential voltage profile obtained based on the voltage and capacity of the reference cell measured while the reference cell is discharged at a C-rate of 0.05 C.

For example, in the embodiment of FIG. 4, the first reference voltage profile (R_dVdQ_P1) may include a plurality of peaks R1, R2, R3, R4, R5, R6, and R7. The peak R1 having the smallest corresponding capacity among the plurality of peaks R1, R2, R3, R4, R5, R6, and R7 may be set as the reference voltage peak (RV1). Here, the capacity of the reference voltage peak (RV1) may be K2 [mAh].

The control unit 120 may be configured to determine whether the available lithium is lost based on the reference voltage peak and the target voltage peak.

Specifically, the control unit 120 may be configured to diagnose whether available lithium included in the battery B is lost based on the behavior change of the target voltage peak with respect to the reference voltage peak.

For example, the control unit 120 may be configured to diagnose that the available lithium of the battery is lost when the number of the determined target voltage peak is two or more.

In the embodiment of FIG. 4, the target capacity range (QR1) of the first differential voltage profile (dVdQ_P1) may include a peak P1 and a peak P2. That is, the peak P1 and a peak P2 may be the target voltage peak (TV1). In this case, since the number of target voltage peaks TV1 is plural, the control unit 120 may diagnose the state of the battery B as an available lithium loss state.

Figure 5:
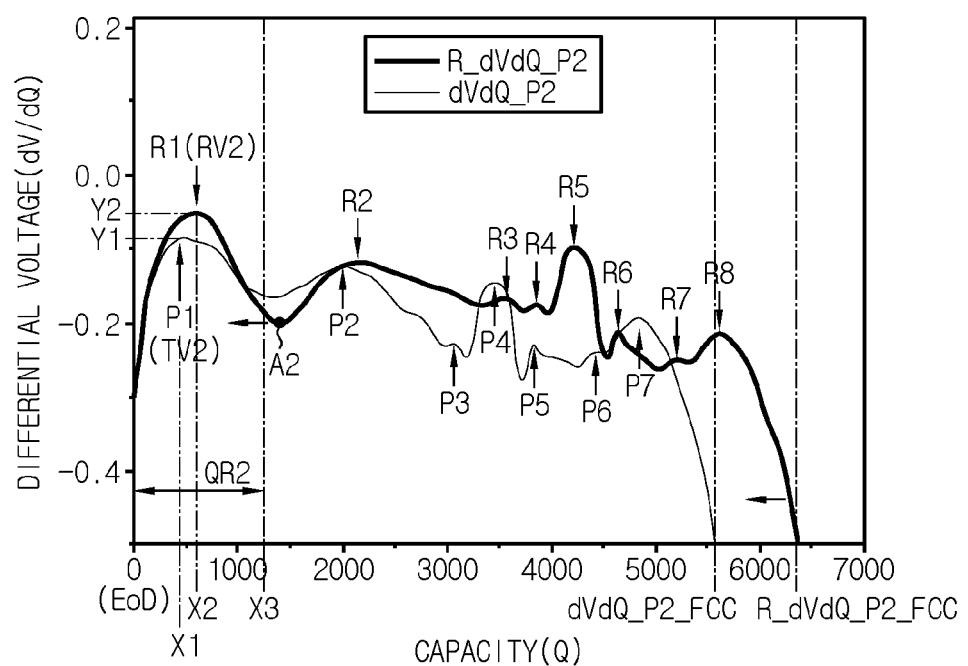
FIG. 5 is a diagram schematically showing a second reference voltage profile and a second differential voltage profile according to an embodiment of the present disclosure.

FIG. 5 is a diagram schematically showing a second reference voltage profile (R_dVdQ_P2) and a second differential voltage profile (dVdQ_P2) according to an embodiment of the present disclosure.

Specifically, FIG. 5 is a diagram illustrating a second reference voltage profile (R_dVdQ_P2) for a battery B in a BoL state and a second differential voltage profile (dVdQ_P2) for a battery B in which available lithium is lost.

Here, the battery B according to the embodiment of FIG. 4 and the battery B according to the embodiment of FIG. 5 may be different from each other. However, for convenience of explanation, the reference signs of the battery B according to the embodiment of FIG. 4 and the battery B according to the embodiment of FIG. 5 are identically described as "B".

In the embodiment of FIG. 5, the second reference voltage profile (R_dVdQ_P2) may include a plurality of peaks R1, R2, R3, R4, R5, R6, R7, R8. In addition, the peak R1 whose corresponding capacity is smallest among the plurality of peaks R1, R2, R3, R4, R5, R6, R7, R8 included in the second reference voltage profile (R_dVdQ_P2) may be set as the reference voltage peak (RV2). Here, the capacity of the reference voltage peak (RV2) may be X2 [mAh].

Also, in the embodiment of FIG. 5, the second differential voltage profile (dVdQ_P2) may include a plurality of peaks P1, P2, P3, P4, P5, P6, P7. The control unit 120 sets the target capacity range (QR2) of the second differential voltage profile (dVdQ_P2) as a capacity range of 0 [mAh] or more and X3 [mAh] or less, and sets the peak P1 included in the target capacity range (QR2) as the target voltage peak (TV2).

The control unit 120 may be configured to diagnose that the available lithium is lost when the number of the determined target voltage peak is one and the differential voltage of the target voltage peak is lower than the differential voltage of the reference voltage peak.

In the embodiment of FIG. 5, since the number of target voltage peaks (TV2) included in the second differential voltage profile (dVdQ_P2) is one, the control unit 120 may compare the differential voltages of the target voltage peak (TV2) and the reference voltage peak (RV2). The differential voltage of the target voltage peak (TV2) is Y1, and the differential voltage of the reference voltage peak (RV2) is Y2. That is, since the differential voltage (Y1) of the target voltage peak (TV2) is smaller than the differential voltage (Y2) of the reference voltage peak (RV2), the control unit 120 may diagnose the state of the battery B as an available lithium loss state.

Referring to FIGS. 4 and 5, when the number of target voltage peaks included in the differential voltage profile is plural, the control unit 120 may diagnose the state of the battery B as an available lithium loss state. In addition, the control unit 120 may also diagnose the state of the battery B as an available lithium loss state even when the number of target voltage peaks included in the differential voltage profile is one and the differential voltage of the target voltage peak is smaller than the differential voltage of the reference voltage peak.

The battery management apparatus 100 according to an embodiment of the present disclosure has an advantage of determining the behavior change of the target voltage peak with respect to the reference voltage peak and specifically diagnosing whether the available lithium of the battery B is lost as a result of the determination. That is, the battery management apparatus 100 has an advantage in that the cause of degradation of the battery B may be specifically diagnosed as the available lithium loss.

Meanwhile, the control unit 120 may be configured to set a capacity range in which the capacity of the reference voltage peak is an intermediate value as the target capacity range.

More specifically, the control unit 120 may be configured to set a capacity range from the discharge end capacity (EoD) of the battery B to a capacity symmetrical to the discharge end capacity (EoD) based on the capacity of the reference voltage peak as the target capacity range.

In the embodiment of FIG. 4, the discharge end capacity (EoD) may be "0 [mAh]", and the capacity of the reference voltage peak (RV1) may be "K2 [mAh]". Also, K4 [mAh] may be "2×K2 [mAh]". Accordingly, the target capacity range (QR1) may be set to a capacity range of 0 [mAh] or more and K4 [mAh] or less.

In the embodiment of FIG. 5, the discharge end capacity (EoD) may be "0 [mAh]", and the capacity of the reference voltage peak (RV2) may be "X2 [mAh]". Also, X3 [mAh] may be "2×X2 [mAh]". Accordingly, the target capacity range (QR2) may be set to a capacity range of 0 [mAh] or more and X3 [mAh] or less.

For example, phase equilibrium may occur several times while the battery B is charged or discharged. In addition, when phase equilibrium occurs, a peak may appear in the differential profile of the battery B. That is, the phase equilibrium generated inside the battery may be expressed in the form of a peak in the differential profile of the battery B.

The reference voltage peak may be set as a peak corresponding to the phase equilibrium occurring at the lowest capacity among a plurality of phase equilibriums that may be generated in the process of discharging the battery B. That is, the reference voltage peak may be set as a peak corresponding to the last phase equilibrium occurring at the discharging end. In addition, in order to determine the target voltage peak corresponding to the reference voltage peak, the control unit 120 may set a capacity range up to a capacity symmetrical to the discharge end capacity (EoD) based on the capacity of the reference voltage peak as the target capacity range.

For example, in the embodiment of FIG. 4, the last phase equilibrium of the reference cell may occur at K2 [mAh], and due to the phase equilibrium, the peak R1 shown in the first reference voltage profile (R_dVdQ_P1) may be set as the reference voltage peak (RV1). In addition, the target capacity range (QR1) may be set to a capacity range of 0 [mAh] or more and K4 [mAh] or less.

As another example, in the embodiment of FIG. 5, the final phase equilibrium of the reference cell may occur at X2 [mAh], and the peak R1 shown in the second reference voltage profile (R_dVdQ_P2) due to the phase equilibrium may be set as the reference voltage peak (RV2). In addition, the target capacity range (QR2) may be set to a capacity range of 0 [mAh] or more and X3 [mAh] or less.

Hereinafter, an embodiment in which the control unit 120 determines the state of the battery B based on the differential capacity profile will be described in detail. In addition, hereinafter, the target peak corresponding to the differential capacity profile will be described as a target capacity peak, and the reference peak will be described as a reference capacity peak.

Specifically, an embodiment in which the control unit 120 determines at least one of whether the positive electrode capacity of the battery B is lost and the available lithium is lost based on the reference capacity peak preset to correspond to the target capacity peak and the target capacity peak will be described in detail.

Figure 6:
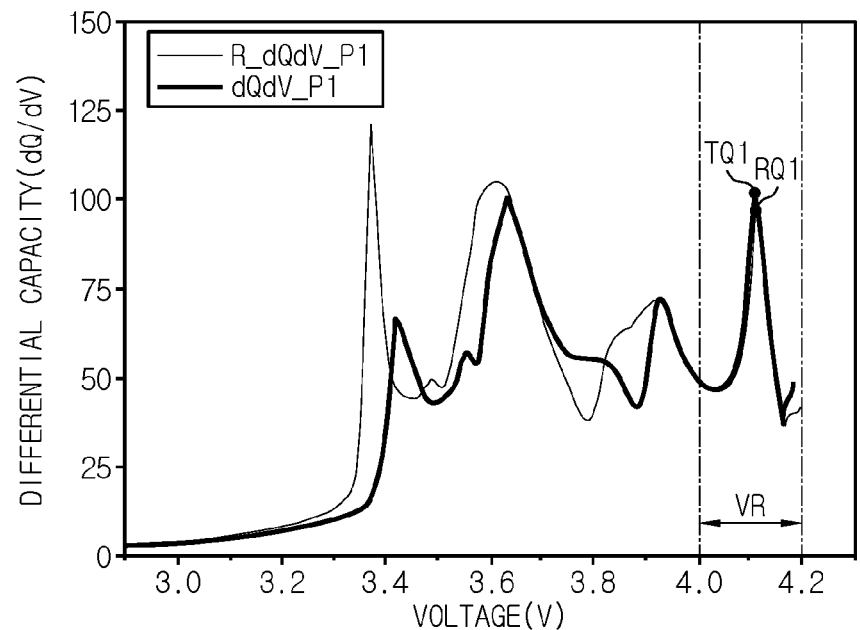
FIG. 6 is a diagram schematically showing a first reference capacity profile and a first differential capacity profile according to an embodiment of the present disclosure.
Figure 6:
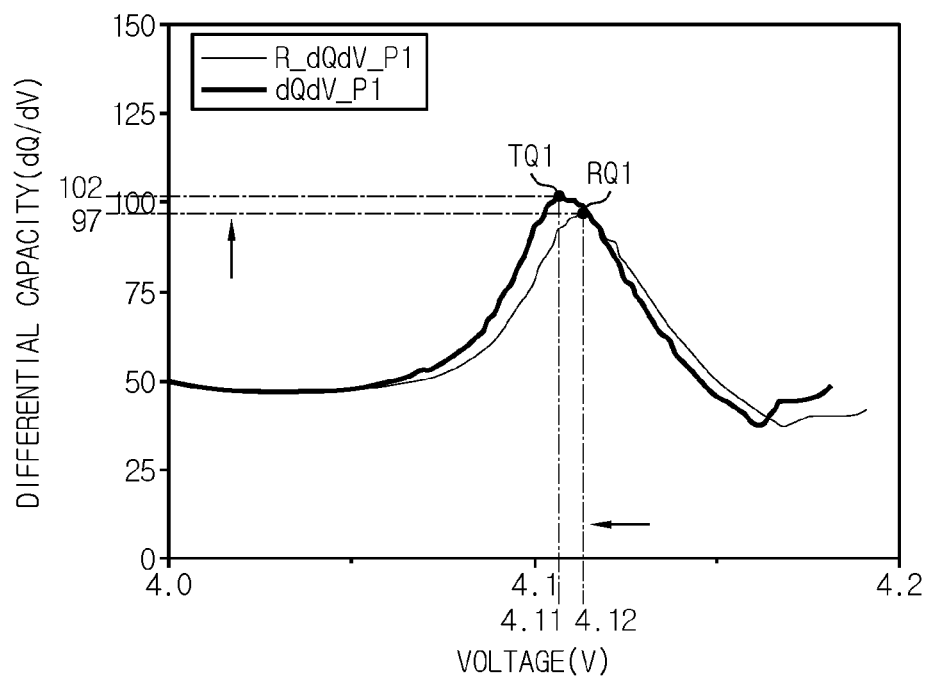

FIG. 6 is a diagram schematically showing a first reference capacity profile (R_dQdV_P1) and a first differential capacity profile (dQdV_P1) according to an embodiment of the present disclosure.

Specifically, FIG. 6 is a diagram illustrating a first reference capacity profile (R_dQdV_P1) for a reference cell (e.g., the battery B in a BoL state) and a first differential capacity profile (dQdV_P1) for a battery B in which available lithium is lost.

More specifically, FIG. 6 is an enlarged view in which the upper side is the first reference capacity profile (R_dQdV_P1) and the first differential capacity profile (dQdV_P1) for the entire voltage range and the lower side is the first reference capacity profile (R_dQdV_P1) and the first differential capacity profile (dQdV_P1) for the target voltage range.

For example, referring to FIG. 6, the profile generating unit 110 may generate a first differential capacity profile (dQdV_P1) representing a correspondence between the voltage of the battery B and the differential capacity.

The control unit 120 may be configured to determine a target capacity peak in a preset target voltage range (VR) of the received differential profile.

First, the control unit 120 may be configured to set a voltage range from a preset voltage to a charge end voltage preset for the battery in the entire voltage range of the differential capacity profile as a target voltage range (VR).

Here, the target voltage range (VR) is a voltage range set by the control unit 120 and may be a voltage range preset to determine a target capacity peak.

Preferably, the control unit 120 may be configured to set a voltage range from a preset voltage to a charge end voltage preset for the battery B as the target voltage range (VR). For example, the charge end voltage preset for the battery B may be 4.2 [V]. In addition, the voltage preset by the control unit 120 may be 4.0 [V]. That is, the target voltage range (VR) may be a voltage range of 4.0 [V] or more and 4.2 [V] or less.

In addition, the control unit 120 may be configured to determine a peak included in the target voltage range of the differential capacity profile as a target capacity peak.

In the embodiment of FIG. 6, a peak included in the target voltage range (VR) of the first differential capacity profile (dQdV_P1) may be determined as the target capacity peak (TQ1). The voltage of the target capacity peak (TQ1) may be 4.11 [V], and the differential capacity may be 102 [mAh/V].

The control unit 120 may be configured to set a peak included in the target voltage range of a reference capacity profile preset to correspond to the differential capacity profile as a reference capacity peak.

For example, the control unit 120 may be configured to preset a peak included in the target voltage range (VR) as the reference capacity peak in the reference capacity profile preset to correspond to the received differential profile. As another example, after the reference capacity peak is preset based on the reference capacity profile, information on the set reference capacity peak may be provided to the control unit 120.

Specifically, the reference capacity profile may be a differential capacity profile generated in the process of charging the reference cell. Here, the reference cell is a cell corresponding to the battery B, and may be a battery B in a BoL state or a cell separately manufactured to generate a reference capacity profile. However, hereinafter, for convenience of explanation, the reference cell will be described as a battery B in a BoL state.

Preferably, the reference capacity profile may be a differential capacity profile obtained based on the voltage and capacity of the reference cell measured while the reference cell is charged at a C-rate of 1 C or less. More preferably, the reference capacity profile may be a differential capacity profile obtained based on the voltage and capacity of the reference cell measured while the reference cell is charged at a C-rate of 0.05 C.

Figure 7:
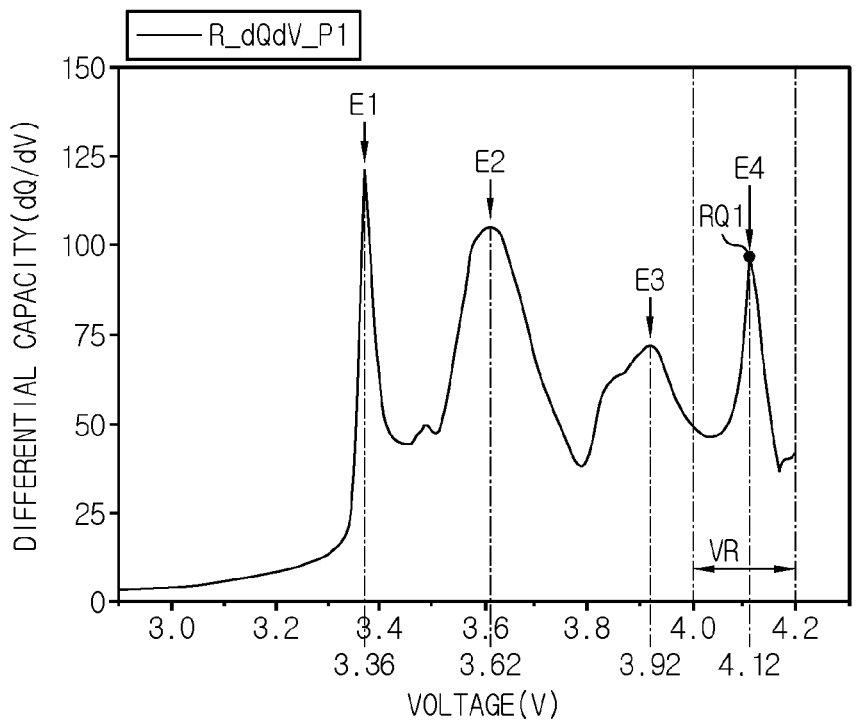
FIG. 7 is a diagram schematically showing a first reference capacity profile according to an embodiment of the present disclosure.

FIG. 7 is a diagram schematically showing a first reference capacity profile (R_dQdV_P1) according to an embodiment of the present disclosure.

In the embodiment of FIG. 7, four phase equilibriums may occur while the battery B is being charged. In the process of charging the battery B from 2.5 [V] to 4.2 [V], a first phase equilibrium peak (E1) may appear at 3.36 [V] and a second phase equilibrium peak (E2) may appear at 3.62 [V]. Also, a third phase equilibrium peak (E3) may appear at 3.92 [V], and a fourth phase equilibrium peak (E4) may appear at 4.12 [V].

In general, the fourth phase equilibrium peak (E4) may be generated in the charge end region of 4.0 [V] or more and 4.2 [V] or less. Accordingly, the control unit 120 may set a voltage range in which the fourth phase equilibrium may occur as a target voltage range (VR). In addition, the control unit 120 may determine a peak included in the target voltage range (VR) of the differential capacity profile as a target capacity peak, and determine a peak included in the target voltage range (VR) of the reference capacity profile as a reference capacity peak.

For example, in the embodiment of FIG. 6, the control unit 120 may determine the first target capacity peak (TQ1) in the target voltage range (VR) of the first differential capacity profile (dQdV_P1) received from the measuring unit 200. Also, the control unit 120 may determine the first reference capacity peak (RQ1) in the target voltage range (VR) of the first reference capacity profile (R_dQdV_P1). Specifically, the voltage of the first target capacity peak (TQ1) may be 4.11 [V], and the differential capacity may be 102 [mAh/V]. In addition, the voltage of the first reference capacity peak (RQ1) may be 4.12 [V], and the differential capacity may be 97 [mAh/V].

The control unit 120 may determine whether the positive electrode capacity of the battery B is lost and whether the available lithium is lost at the same time based on the behavior change of the reference capacity peak and the target capacity peak corresponding to each other.

In general, since the target voltage range (VR) is a voltage range corresponding to the charge end of the battery B, the fourth phase equilibrium peak (E4) belonging to the target voltage range (VR) is a peak reflecting the state of the positive electrode. Therefore, the fourth phase equilibrium peak (E4) is used to determine the state change of the positive electrode.

Differently from the above, the control unit 120 may determine not only whether positive electrode capacity is lost but also whether available lithium is lost based on the behavior change of the target capacity peak with respect to the reference capacity peak corresponding to the fourth phase equilibrium peak (E4).

For example, among a plurality of items for diagnosing degradation of the battery B, whether positive electrode capacity is lost is a diagnostic item related to the positive electrode, and whether available lithium is lost is a diagnostic item related to the negative electrode. Additional diagnostic items include whether there is overvoltage, whether negative electrode capacity related to the negative electrode is lost, and so on.

That is, the control unit 120 may determine not only whether the positive electrode capacity related to the positive electrode is lost but also whether the available lithium related to the negative electrode is lost by using the target capacity peak reflecting the state of the positive electrode of the battery B.

Specifically, the control unit 120 may be configured to determine whether available lithium of the battery B is lost according to a result of comparing the differential capacity and voltage of the reference capacity peak with the differential capacity and voltage of the target capacity peak, respectively.

For example, when the differential capacity of the target capacity peak increases compared to the differential capacity of the reference capacity peak and the voltage of the target capacity peak decreases compared to the voltage of the reference capacity peak, the control unit 120 may be configured to determine that available lithium of the battery B is lost.

In the embodiment of FIG. 6, the control unit 120 may determine whether available lithium of the battery B is lost by a result of comparing the voltages and differential capacities of the first reference capacity peak (RQ1) of the first reference capacity profile (R_dQdV_P1) and the first target peak (TQ1) of the first differential capacity profile (dQdV_P1). The differential capacity of the first target capacity peak (TQ1) may be 102 [mAh/V], and the voltage may be 4.11 [V]. In addition, the differential capacity of the first reference capacity peak (RQ1) may be 97 [mAh/V], and the voltage may be 4.12 [V]. That is, since the differential capacity (102 [mAh/V]) of the first target capacity peak (TQ1) increases compared to the differential capacity (97 [mAh/V]) of the first reference capacity peak (RQ1) and the voltage (4.11 [V]) of the first target capacity peak (TQ1) decreases compared to the voltage (4.12 [V]) of the first reference capacity peak (RQ1), the control unit 120 may determine that the available lithium of the battery B is lost.

In general, when available lithium is lost, the voltage of the battery B at which the fourth phase equilibrium occurs may decrease. Specifically, the voltage of the battery B may be a difference between the positive electrode voltage and the negative electrode voltage. For example, the voltage of the battery B may be expressed by the formula "positive electrode voltage−negative electrode voltage". That is, when the available lithium of the battery B is lost, the negative electrode voltage of the battery B may increase, and when the negative electrode voltage of the battery B increases, the voltage of the battery B may decrease according to the formula "positive electrode voltage−negative electrode voltage". Specifically, the relationship between the available lithium loss and the voltage of the battery B will be described with reference to FIG. 3.

For example, in the embodiment of FIG. 3, when available lithium of the battery B is lost, the positive electrode profile is maintained as it is, but the negative electrode profile may be shifted to the right as a whole. In this case, since the negative electrode voltage increases at the same capacity, the voltage of the battery B may decrease as a whole. That is, the voltage at which the fourth phase equilibrium occurs in the battery B where available lithium is lost may be lower than the voltage at which the fourth phase equilibrium occurs in the battery B of a BoL state. Accordingly, in the embodiment of FIG. 6, the voltage of the first target capacity peak (TQ1) may be lower than the voltage of the first reference capacity peak (RQ1).

Also, when available lithium is lost, the expression capacity of the battery B may increase. For example, in the embodiment of FIG. 3, since the negative electrode voltage increases at the same capacity when available lithium is lost, the voltage of the battery B for the same capacity may decrease. In other words, when available lithium is lost, the expression capacity of the battery B for the same voltage may increase. Therefore, the capacity expressed when the fourth phase equilibrium occurs in the battery B where available lithium is lost may increase compared to the capacity expressed when the fourth phase equilibrium occurs in the battery B of a BoL state. In addition, the expression capacity of the battery B is related to the differential capacity of the differential capacity profile. That is, in the embodiment of FIG. 6, the differential capacity of the first target capacity peak (TQ1) for the battery B where available lithium is lost may be greater than the differential capacity of the first reference capacity peak (RQ1).

Therefore, in the embodiment of FIG. 6, the control unit 120 may determine whether the available lithium of the battery B is lost according to the result of comparing the differential capacities and voltages between the first target capacity peak (TQ1) and the first reference capacity peak (RQ1).

In addition, the control unit 120 may be configured to determine whether the positive electrode capacity of the battery B is lost according to a result of comparing the differential capacity of the reference capacity peak with the differential capacity of the target capacity peak.

Specifically, when the differential capacity of the target capacity peak decreases compared to the differential capacity of the reference capacity peak, the control unit 120 may be configured to determine that the positive electrode capacity of the battery B is lost.

In the embodiment of FIG. 3, when the positive electrode capacity is lost, the negative electrode profile is maintained as it is, but the positive electrode profile may be shifted to the left as a whole. In this case, since the positive electrode voltage increases for the same capacity, the voltage of the battery B for the same capacity may increase. That is, if the positive electrode capacity is lost, the expression capacity of the battery B for the same voltage may be reduced. Therefore, the capacity expressed when the fourth phase equilibrium occurs in the battery B where the positive electrode capacity is lost may decrease compared to the capacity expressed when the fourth phase equilibrium occurs in the battery B of a BoL state.

Figure 8:
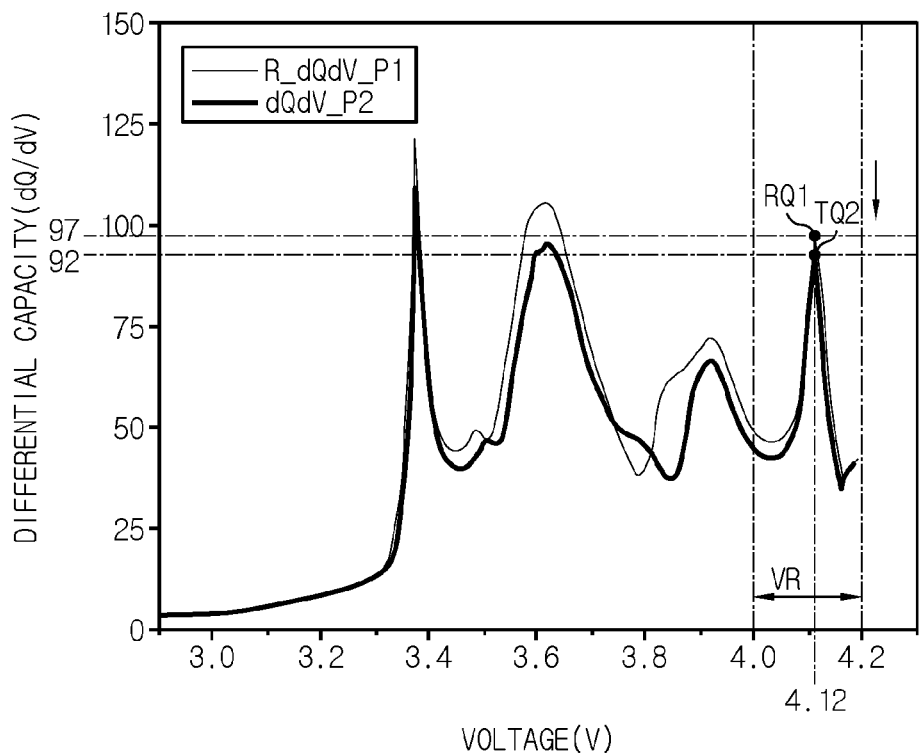
FIG. 8 is a diagram schematically showing a first reference capacity profile and a second differential capacity profile according to an embodiment of the present disclosure.

FIG. 8 is a diagram schematically showing a first reference capacity profile (R_dQdV_P1) and a second differential capacity profile (dQdV_P2) according to an embodiment of the present disclosure.

Specifically, FIG. 8 is a diagram illustrating the first reference capacity profile (R_dQdV_P1) for a battery B in a BoL state and the second differential capacity profile (dQdV_P2) for a battery B where positive electrode capacity is lost. The first reference capacity profile (R_dQdV_P1) of FIGS. 6 to 8 may be the same.

For example, in the embodiment of FIG. 8, voltages of the first reference capacity peak (RQ1) and the second target capacity peak (TQ2) may be the same as 4.12 [V]. In addition, the differential capacity of the first reference capacity peak (RQ1) may be 97 [mAh], and the differential capacity of the second target capacity peak (TQ2) may be 92 [mAh].

As described above, since the expression capacity of the battery B is related to the differential capacity of the differential capacity profile, in the embodiment of FIG. 8, the differential capacity (92 [V/mAh]) of the second target capacity peak (TQ2) for the battery B where positive electrode capacity is lost may be smaller than the differential capacity (97 [V/mAh]) of the first reference capacity peak (RQ1) for the battery B in a BoL state. Accordingly, in the embodiment of FIG. 8, the control unit 120 may determine that the positive electrode capacity of the battery B is lost.

Preferably, in order for the fourth phase equilibrium to occur in the process of charging the battery B, the content of nickel included in the positive electrode material of the battery B may be 80% or more.

That is, the target capacity peak may be a peak appearing in the target voltage range (VR) of the differential capacity profile of the battery B containing a positive electrode material where a nickel content is 80% or more. For example, the battery B may include a positive electrode material where a nickel content is 80% or more, such as NCM811 or NCM9½½. Here, N is nickel (Ni), C is cobalt (Co), and M is manganese (Mn).

Specifically, when the content of nickel included in the positive electrode material is 80% or more, the target capacity peak corresponding to the fourth phase equilibrium peak (E4) may be clearly determined by the control unit 120.

Here, the target capacity peak may be a point where the instantaneous change rate of the differential capacity for the voltage is 0, the instantaneous change rate of the differential capacity for the voltage at a low voltage side is a positive number, and the instantaneous change rate of the differential capacity for the voltage at a high voltage side is a negative number. For example, in the embodiments of FIGS. 6 and 8, the target capacity peak may be a peak having a convex form.

Meanwhile, if the content of nickel contained in the positive electrode material is less than 80%, the fourth phase equilibrium may not occur, and even if the fourth phase equilibrium occurs, the corresponding target capacity peak may not be generated. That is, even when the fourth phase equilibrium occurs, a point where the instantaneous change rate of the differential capacity for the voltage is 0, the instantaneous change rate of the differential capacity for the voltage at a low voltage side is a positive number, and the instantaneous change rate of the differential capacity for the voltage at a high voltage side is a negative number may not be generated.

Therefore, since the battery management apparatus 100 according to an embodiment of the present disclosure uses the battery B containing a positive electrode material where a nickel content is 80% or more, it is possible to clearly determine the target capacity peak in the differential capacity profile. Accordingly, the battery management apparatus 100 may more accurately determine whether the positive electrode capacity of the battery B is lost and whether the available lithium is lost.

Figure 9:
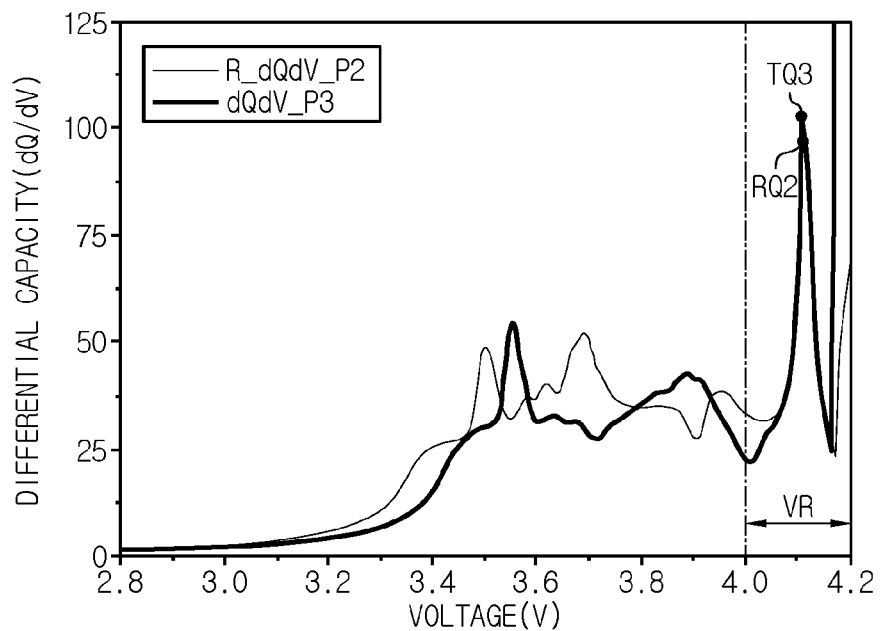
FIG. 9 is a diagram schematically showing a second reference capacity profile and a third differential capacity profile according to an embodiment of the present disclosure.
Figure 9:
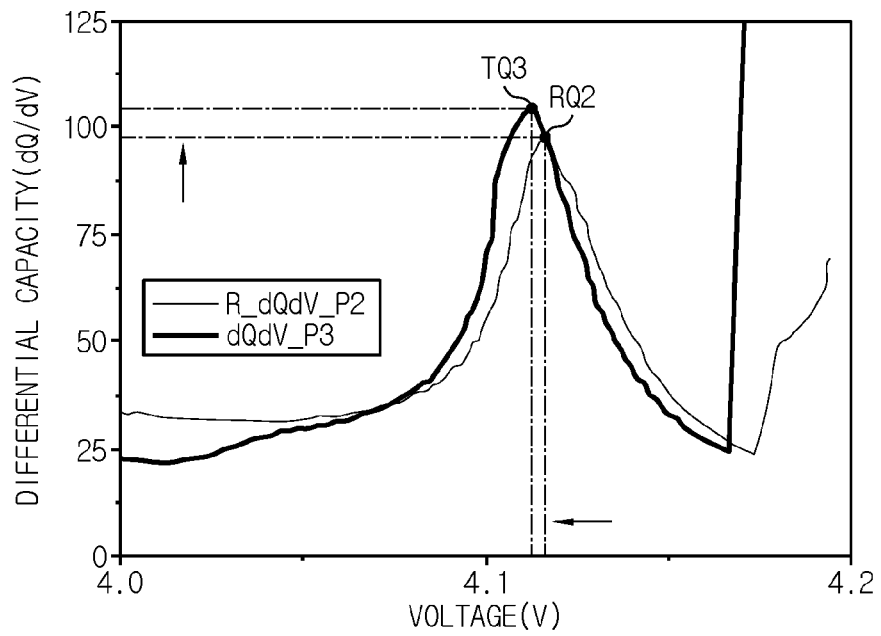

FIG. 9 is a diagram schematically showing a second reference capacity profile (R_dQdV_P2) and a third differential capacity profile (dQdV_P3) according to an embodiment of the present disclosure.

Specifically, FIG. 9 is a diagram illustrating the second reference capacity profile (R_dQdV_P2) for a battery B in a BoL state and the third differential capacity profile (dQdV_P3) for a battery B where available lithium is lost.

More specifically, FIG. 9 is an enlarged view where the upper part is the second reference capacity profile (R_dQdV_P2) and the third differential capacity profile (dQdV_P3) for the entire voltage range, and the lower part is the second reference capacity profile (R_dQdV_P2) and the third differential capacity profile (dQdV_P3) for the target voltage range.

In addition, in the embodiment of FIG. 9, the battery B may include a composite negative electrode material in which graphite and SiO are mixed. Here, the ratio of graphite and SiO contained in the negative electrode material of the battery B may be graphite:SiO (9:1). In addition, the content of nickel contained in the positive electrode material of the battery B may be 80%. For example, the battery B may include a positive electrode material where the content of nickel such as NCM811 or NCM9½½ is 80% or more.

Referring to FIG. 9, even in the third differential capacity profile (dQdV_P3) of the battery B including the composite negative electrode material, the third target capacity peak (TQ3) may be included in the target voltage range (VR). The control unit 120 may determine the behavior change of the third target capacity peak (TQ3) determined in the target voltage range (VR) of the third differential capacity profile (dQdV_P3) for the second reference capacity peak (RQ2) preset in the target voltage range (VR) of the second reference capacity profile (R_dQdV_P2).

Specifically, the voltage of the third target capacity peak (TQ3) decreases compared to the voltage of the second reference capacity peak (RQ2), and the differential capacity of the third target capacity peak (TQ3) increases compared to the differential capacity of the second reference capacity peak (RQ2). Accordingly, the control unit 120 may determine that the available lithium of the battery B is lost.

When it is determined that the positive electrode capacity or the available lithium of the battery B is lost, the control unit 120 may be configured to change at least one of an uppermost threshold value of the charging C-rate and an uppermost threshold value of the discharging C-rate preset for the battery B.

Preferably, when it is determined that the available lithium of the battery B is lost or the positive electrode capacity is reduced, the control unit 120 may change the uppermost threshold value of the charging C-rate and the uppermost threshold value of the discharging C-rate to reduce the degradation rate of the battery B.

For example, the control unit 120 may change each of the uppermost threshold value of the charging C-rate of the battery B and the uppermost threshold value of the discharging C-rate of the battery B to a value corresponding to 90% of a currently set value.

That is, when it is determined that the positive electrode capacity of the battery B or the available lithium of the battery B is lost, the battery management apparatus 100 may change the uppermost threshold value of the charging/discharging C-rate to induce the battery B to be charged or discharged at a lower C-rate than the a currently-set charging/discharging C-rate. Accordingly, since the battery B may be charged and discharged at a lower C-rate, the degradation rate of the battery B may be slowed down.

In addition, the battery management apparatus 100 according to the present disclosure may be provided to a battery pack 10. For example, referring to FIG. 2, the battery pack 10 according to the present disclosure may include the battery management apparatus 100, at least one battery B, and a measuring unit 200. In addition, the battery pack 10 may further include electrical equipment (relays, fuses, etc.) and a case.

In addition, the charging and discharging device 20 capable of charging and/or discharging the battery B may be connected to the battery pack 10. For example, the charging and discharging device 20 may be connected to the positive electrode terminal (P+) and the negative electrode terminal (P−) of the battery pack 10.

FIG. 10 is a diagram schematically showing a battery management method according to another embodiment of the present disclosure.

Each step of the battery management method may be performed by the battery management apparatus 100 according to an embodiment of the present disclosure. Hereinafter, for convenience of description, content overlapping with the previously described content will be briefly described or omitted.

Referring to FIG. 10, the battery management method may include a battery profile obtaining step (S100), a differential profile generating step (S200), a target peak determining step (S300), and a battery state determining step (S400).

The battery profile obtaining step (S100) is a step of obtaining a battery profile representing a correspondence between voltage and capacity of a battery B, and may be performed by the profile generating unit 110.

For example, in the embodiment of FIG. 3, the profile generating unit 110 may obtain a battery profile representing a correspondence between the voltage and capacity of the battery B from the measuring unit 200.

The differential profile generating step (S200) is a step of generating at least one of a differential voltage profile representing a correspondence between a differential voltage for the capacity of the battery B and the capacity of the battery B and a differential voltage profile representing a correspondence between a differential capacity for the voltage of the battery B and the voltage based on the obtained battery profile, and may be performed by the profile generating unit 110.

For example, in the embodiment of FIG. 4, the profile generating unit 110 may generate a first differential voltage profile (dVdQ_P1) representing a correspondence between the capacity of the battery B and the differential voltage. In addition, in the embodiment of FIG. 5, the profile generating unit 110 may generate a second differential voltage profile (dVdQ_P2) representing a correspondence between the capacity of the battery B and the differential voltage.

As another example, in the embodiment of FIG. 6, the profile generating unit 110 may generate a first differential capacity profile (dQdV_P1) representing a correspondence between the voltage of the battery B and the differential capacity. In addition, in the embodiment of FIG. 8, the profile generating unit 110 may generate a second differential capacity profile (dQdV_P2) representing a correspondence between the voltage of the battery B and the differential capacity. In addition, in the embodiment of FIG. 9, the profile generating unit 110 may generate a third differential capacity profile (dQdV_P3) representing a correspondence between the voltage of the battery B and the differential capacity.

The target peak determining step (S300) is a step of determining a target peak included in the generated differential profile according to a rule corresponding to the type of the differential profile generated in the differential profile generating step (S200), and may be performed by the control unit 120.

For example, when the control unit 120 receives the differential voltage profile from the profile generating unit 110, the control unit 120 may determine a peak included in the target capacity range among the entire capacity region of the differential voltage profile as the target voltage peak.

In the embodiment of FIG. 4, the control unit 120 may receive the first differential voltage profile (dVdQ_P1) from the profile generating unit 110, and determine the first peak (P1) and the second peak (P2) included in the target capacity range (QR1) of the first differential voltage profile (dVdQ_P1) as the target voltage peak (TV1).

In the embodiment of FIG. 5, the control unit 120 may receive the second differential voltage profile (dVdQ_P2) from the profile generating unit 110, and determine the first peak (P1) included in the target capacity range (QR2) of the second differential voltage profile (dVdQ_P2) as the target voltage peak (TV2).

As another example, when the control unit 120 receives the differential capacity profile from the profile generating unit 110, the control unit 120 may determine a peak included in the target voltage range among the entire capacity region of the differential capacity profile as the target capacity peak.

In the embodiment of FIG. 6, the control unit 120 may receive the first differential capacity profile (dQdV_P1) from the profile generating unit 110, and determine a peak included in the target voltage range (VR) of the first differential capacity profile (dQdV_P1) as the target capacity peak (TQ1).

In the embodiment of FIG. 8, the control unit 120 may receive the second differential capacity profile (dQdV_P2) from the profile generating unit 110, and determine a peak included in the target voltage range (VR) of the second differential capacity profile (dQdV_P2) as the target capacity peak (TQ2).

In the embodiment of FIG. 9, the control unit 120 may receive the third differential capacity profile (dQdV_P3) from the profile generating unit 110, and determine a peak included in the target voltage range (VR) of the third differential capacity profile (dQdV_P3) as the target capacity peak (TQ3).

The battery state determining step (S400) is a step of determining the state of the battery B based on a behavior change of the target peak with respect to a reference peak preset to correspond to the type of the generated differential profile, and may be performed by the control unit 120.

Specifically, the control unit 120 may determine whether the positive electrode capacity and/or the available lithium of the battery B is lost based on the behavior change of the target peak with respect to the reference peak.

For example, when the control unit 120 receives a differential voltage profile from the profile generating unit 110, the control unit 120 may determine whether the available lithium of the battery B is lost based on the number of target voltage peaks and the differential voltage of the target voltage peak.

In the embodiment of FIG. 4, since the number of first target capacity peaks (TV1) included in the first differential voltage profile (dVdQ_P1) is plural, the control unit 120 may determine that the available lithium of the battery B is lost.

In the embodiment of FIG. 5, the number of second target capacity peaks (TV2) included in the second differential voltage profile (dVdQ_P2) is one. However, since the differential voltage of the second target capacity peak (TV2) is smaller than the differential voltage of the second reference voltage peak (RV2), the control unit 120 may determine that the available lithium of the battery B is lost.

As another example, when the control unit 120 receives the differential capacity profile from the profile generating unit 110, the control unit 120 may determine whether the available lithium of the battery B is lost and/or whether the positive electrode capacity is lost based on the voltage and the differential capacity of the target capacity peak.

In the embodiment of FIG. 6, since the differential capacity (102 [mAh/V]) of the first target capacity peak (TQ1) is greater than the differential capacity (97 [mAh/V]) of the first reference capacity peak (RQ1) and the voltage (4.11 [V]) of the first target capacity peak (TQ1) is less than the voltage (4.12 [V]) of the first reference capacity peak (RQ1), the control unit 120 may determine that the available lithium of the battery B is lost.

In the embodiment of FIG. 8, even if the voltage of the second target capacity peak (TQ2) and the voltage of the first reference capacity peak (RQ1) are the same as 4.12 [V], since the differential capacity (92 [mAh/V]) of the second target capacity peak (TQ2) is smaller than the differential capacity (97 [mAh/V]) of the first reference capacity peak (RQ1), the control unit 120 may determine that the positive electrode capacity of the battery B is lost.

In the embodiment of FIG. 9, since the differential capacity of the third target capacity peak (TQ3) is greater than the differential capacity of the second reference capacity peak (RQ2) and the voltage of the third target capacity peak (TQ3) is smaller than the voltage of the second reference capacity peak (RQ2), the control unit 120 may determine that the available lithium of the battery B is lost.

The embodiments of the present disclosure described above may not be implemented only through an apparatus and a method, but may be implemented through a program that realizes a function corresponding to the configuration of the embodiments of the present disclosure or a recording medium on which the program is recorded. The program or recording medium may be easily implemented by those skilled in the art from the above description of the embodiments.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

Additionally, many substitutions, modifications and changes may be made to the present disclosure described hereinabove by those skilled in the art without departing from the technical aspects of the present disclosure, and the present disclosure is not limited to the above-described embodiments and the accompanying drawings, and each embodiment may be selectively combined in part or in whole to allow various modifications.

REFERENCE SIGNS

10: battery pack
100: battery management apparatus
110: profile generating unit
120: control unit
130: storage unit
200: measuring unit
20: charging and discharging device
B: battery

What is claimed is:
1. A battery management apparatus, comprising:
a control unit programmed to operate according to each of a first setting and a second setting, the control unit configured to:
receive a differential profile, wherein the differential profile is based on a battery profile representing a corre- spondence between a voltage and a capacity of a battery, wherein a type of the received differential profile is either a first type representing a correspondence between a differential voltage for the capacity of the battery and the capacity of the battery or a second type representing a correspondence between a differential capacity for the voltage of the battery and the voltage of the battery;

determine whether to operate according to the first setting or the second setting based on the type of the received differential profile;

determine a target peak included in the received differential profile, wherein in the first setting the control unit is configured to determine the target peak according to at least one first rule and in the second setting the control unit is configured to determine the target peak according to at least one second rule that is different from the first rule; and determine a state of the battery based on a behavior change of the target peak with respect to a reference peak preset to correspond to the type of the received differential profile.

2. The battery management apparatus according to claim 1, wherein the control unit is configured to:

in response to the differential profile being the first type representing the correspondence between the differential voltage and the capacity, determine whether available lithium of the battery is lost based on the behavior change of the target peak with respect to the reference peak; and in response to the differential profile being the second type representing the correspondence between the differential capacity and the voltage determine at least one of (a) whether positive electrode capacity of the battery is lost or (b) whether the available lithium of the battery is lost, based on the behavior change of the target peak with respect to the reference peak.

3. The battery management apparatus according to claim 2, wherein the control unit is configured to:

set a target capacity range based on a capacity of a reference voltage peak corresponding to the first type of the different profile;

determine a target voltage peak included in the target capacity range of the first type of the different profile; and determine whether the available lithium is lost based on the reference voltage peak and the target voltage peak.

4. The battery management apparatus according to claim 3, wherein the reference voltage peak is a peak whose corresponding capacity is smallest in a reference voltage profile corresponding to the first type of the different profile.

5. The battery management apparatus according to claim 3, wherein the control unit is configured to:

determine a discharge end capacity based on the capacity of the reference voltage peak; and set the target capacity range from a discharge end capacity of the battery to a second capacity symmetrical to the discharge end capacity of the battery.

6. The battery management apparatus according to claim 3, wherein the control unit is configured to:

determine that there is only one target voltage peak; and in response to there being only one target voltage peak, determine that available lithium of the battery is lost based on a differential voltage of the target voltage peak decreasing compared to a differential voltage of the reference voltage peak.

7. The battery management apparatus according to claim 3, wherein the control unit is configured to:

determine that there are two or more target voltage peaks; and determine that available lithium of the battery is lost based on there being two or more target voltage peaks.

8. The battery management apparatus according to claim 2, wherein the control unit is configured to:

set a target voltage range of the second type of the different profile from a preset voltage to a charge end voltage preset for the battery;

determine a target capacity peak included in the target voltage range of the second type of the different profile; and determine at least one of (a) whether the positive electrode capacity is lost or (b) whether the available lithium is lost, based on the target capacity peak and a reference capacity peak preset to correspond to the target capacity peak.

9. The battery management apparatus according to claim 8, wherein the control unit is configured to set a reference capacity peak included in the target voltage range of a reference capacity profile preset to correspond to the second type of the different profile.

10. The battery management apparatus according to claim 9, wherein the control unit is configured to:

determine whether the positive electrode capacity of the battery is lost according to a comparison of a differential capacity of the reference capacity peak to a differential capacity of the target capacity peak; and determine whether the available lithium of the battery is lost according to a comparison of the differential capacity and the voltage of the reference capacity peak to the differential capacity and the voltage of the target capacity peak, respectively.

11. The battery management apparatus according to claim 10, wherein the control unit is configured to determine that available lithium of the battery is lost, in response to the differential capacity of the target capacity peak increasing compared to the differential capacity of the reference capacity peak and the voltage of the target capacity peak decreasing compared to the voltage of the reference capacity peak.

12. The battery management apparatus according to claim 10, wherein the control unit is configured to determine that positive electrode capacity of the battery is lost, in response to the differential capacity of the target capacity peak decreasing compared to the differential capacity of the reference capacity peak.

13. The battery management apparatus according to claim 2, wherein the control unit is configured to change at least one of a threshold value of a charging C-rate and a threshold value of a discharging C-rate preset for the battery, in response to the positive electrode capacity or the available lithium of the battery being lost.

14. A battery pack, comprising the battery management apparatus according to claim 1.

15. A battery management method, the method performed by a control unit programmed to operate according to each of a first setting and a second setting, the method comprising:

receiving a differential profile, wherein the differential profile is based on a battery profile representing a correspondence between a voltage and a capacity of a battery, wherein a type of the received differential profile is either a first type representing (a) a correspondence between a differential voltage for the capacity of the battery and the capacity of the battery or a second type representing a correspondence between a differential capacity for the voltage of the battery and the voltage;

determining whether to operate according to the first setting or the second setting based on the type of the received differential profile;

determining a target peak included in the generated differential profile, wherein in the first setting the control unit is configured to determine the target peak according to at least one first rule and in the second setting the control unit is configured to determine the target peak according to at least one second rule that is different from the first rule; and determining a state of the battery based on a behavior change of the target peak with respect to a reference peak preset to correspond to the type of the generated differential profile.

16. The battery management apparatus according to claim 1, wherein the reference peak is a predetermined value corresponding to a peak value of a differential profile of a reference battery, and wherein the type of the differential profile of the reference battery corresponds to the type of the received differential profile.

* * * * *